United States Patent [19]

Berghmans

[11] 4,348,497

[45] Sep. 7, 1982

[54] ACRYLIC RESIN WITH ANTIPLASTICIZER

[75] Inventor: Jacques M. L. Berghmans, Lint, Belgium

[73] Assignee: E. I. Du Pont de Nemours and Company, Wilmington, Del.

[21] Appl. No.: 245,929

[22] Filed: Mar. 20, 1981

[51] Int. Cl.$^3$ ............................................. C08L 61/28
[52] U.S. Cl. .................................... 524/293; 428/522
[58] Field of Search .................. 260/31.6; 525/5, 162, 525/375; 560/112

[56] References Cited

U.S. PATENT DOCUMENTS 2,624,752 1/1953 Morris et al. ...................... 260/476
3,622,651 11/1971 Vasta ................................... 260/856

Primary Examiner—Theodore E. Pertilla
Attorney, Agent, or Firm—Richard H. Burgess

[57] ABSTRACT

A thermosetting acrylic enamel composition blended with pentaerythritol tetrabenzoate as an antiplasticizer gives superior appearance, hardness, and resistance to acid and solvents.

4 Claims, No Drawings

ACRYLIC RESIN WITH ANTIPLASTICIZER

BACKGROUND

It is desirable to improve the properties of coating compositions such as those of U.S. Pat. No. 3,622,651—Vasta, issued Nov. 23, 1971, incorporated herein by reference, especially compositions to be used for critical applications such as the clear coat of an automotive color coat/clear coat system. The clear coat is applied over a pigmented color coat and enhances the appearance of the system. However, being substantially transparent, the clear coat is subjected to degradation from ultraviolet light in addition to other environmental effects. Thus, the properties of such a clear coat are particularly important.

SUMMARY OF THE INVENTION

The present invention provides a liquid coating composition comprising solvents and (a) 93-50%, by weight, of a polymer having a backbone of polymerized ethylenically unsaturated monomers and having ester groups attached directly to its backbone, said ester groups comprising about 10 to 75 percent of the total weight of the polymer and consisting essentially of Ester Group (A)

$$-\overset{O}{\underset{\|}{C}}-O-R^1-OH \text{ and}$$

and
Ester Group (B) selected from the group consisting of $$-\overset{O}{\underset{\|}{C}}-O-R^1-O-\overset{O}{\underset{\|}{C}}-R^2-\overset{O}{\underset{\|}{C}}-O-CH_2-\underset{\underset{CH_2-O-\overset{O}{\underset{\|}{C}}-R^3}{|}}{\overset{OH}{\underset{|}{C}}}-H$$

$$-\overset{O}{\underset{\|}{C}}-O-R^1-O-\overset{O}{\underset{\|}{C}}-R^2-\overset{O}{\underset{\|}{C}}-O-\underset{\underset{CH_2-O-\overset{O}{\underset{\|}{C}}-R^3}{|}}{\overset{H\ OH}{\underset{|\ |}{C}-CH}}$$

or mixtures thereof, wherein the molar ratio of Ester Group (A) to Ester Group (B) is from about 1:1.5 to 1:2.5; and wherein $R^1$ is a saturated hydrocarbon radical containing 2-10 carbon atoms;

$R^2$ is selected from the group consisting of alkylene, vinylene, aromatic, carbocyclic and heteroradicals, and $R^3$ is selected from the group consisting of a saturated aliphatic hydrocarbon radical having one to 26 carbon atoms and an ethylenically unsaturated aliphatic hydrocarbon radical having 12 to 18 carbon atoms;

(b) 5-50% by weight, based on the weight of the polymer, of a melamine formaldehyde resin which has been at least partially reacted with an aliphatic monohydric alcohol having from 1-4 carbon atoms;

(c) 2-15% by weight, based on the weight of the polymer, of pentaerythritol tetrabenzoate.

Preferably, the backbone consists essentially of styrene and an acrylic ester selected from the group consisting of an alkyl methacrylate, an alkyl acrylate and mixture thereof in which the alkyl group contains 1-12 carbon atoms; in which $R^1$ is a saturated hydrocarbons group having 2-4 carbon atoms, $R^2$ is an aromatic radical, and $R^3$ is a tertiary hydrocarbon group having eight through ten carbon atoms.

The preferred level of pentaerythritol tetrabenzoate is about 5% by weight, based on the weight of the polymer.

DETAILED DESCRIPTION

A clear coat composition of the invention is prepared by blending the following ingredients and reacting them by heating I to reflex, about 150° C., then adding II and refluxing for 8 hours.

|  |  | Weight Parts |
|---|---|---|
| I | Solvesso 100 hydrocarbon solvent (Exxon Chemicals) | 35.00 |
|  | Phthalic anhydride | 3.60 |
| II | Cardura E* (Shell Chemical) | 6.00 |
|  | Styrene | 6.00 |
|  | Methyl methacrylate | 7.80 |
|  | Butyl methacrylate | 12.00 |
|  | Hydroxy ethyl acrylate | 11.10 |
|  | Ethyl hexyl acrylate | 12.00 |
|  | Phthalic anhydride | 1.50 |
|  | Acrylic acid | 1.50 |
|  | Solvesso 100 | 5.00 |
|  | Tertiary butyl perbenzoate | 2.77 |

*Cardura E is the glycidyl ester of a tertiary monocarboxylic acid, which acid contains 9-11 carbon atoms.

to give a solids content of 60.19% and a Gardner-Holdt viscosity of J.

Cardura E is the glycidyl ester of a tertiary monocarboxylic acid, which acid contains 9-11 carbon atoms.

The acrylate resin at 60% solids is then blended with melamine and solvents as follows:

|  | Weight Parts |
|---|---|
| Acrylate resin | 43.43 |
| Luwipal 015 melamine resin (BASF) | 23.04 |
| Tinuvin 900 substituted hydroxyphenyl benzotriazoles UV stabilizer (Ciba Geigy) | 0.2 |
| Tinuvin 292 substituted hydroxyphenyl benzotriazoles UV stabilizer (Ciba Geigy) | 0.2 |
| Solvents: |  |
| Butyl acetate | 4.73 |
| Xylene | 4.55 |
| Butanol | 1.20 |
| Solvesso 100 | 4.35 |
| Butyl cellosolve acetate | 2.70 |
| Cellulose acetate | 4.00 |
| and these diluted with xylene | 10.00 |

Finally, pentaerythritol tetrabenzoate additive is blended with the above composition at a level of 2% and 3% by weight, based on the weight of the polymer. Comparative tests were run with no additive and with 1% additive. Both comparative tests gave no improvement in resistance to xylene. Compared with no additive, the 2% and 3% levels of additive gave substantial improvement in resistance to $H_2SO_4$ and to xylene and doubled the Knoop hardness from 2.4 to 4.65 and 4.61 respectively. Although 1% additive resulted in poorer appearance than no additive, the 2% and 3% levels of additive gave very good appearance as did no additive. Thus, at least 2% of the additive substantially improves the properties of coating compositions of the invention. It is believed that this improvement occurs by means of the additive acting as an antiplasticizer.

I claim:

1. A liquid coating composition comprising solvents and
   (a) 93–50%, by weight, of a polymer having a backbone of polymerized ethylenically unsaturated monomers and having ester groups attached directly to its backbone, said ester groups comprising about 10 to 75 percent of the total weight of the polymer and consisting essentially of Ester Group (A)

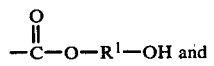

and Ester Group (B) selected from the group consisting of

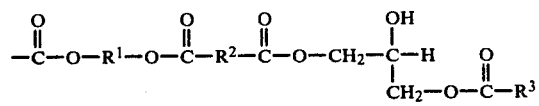

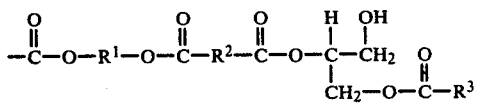

or
   mixtures thereof, wherein the molar ratio of Ester Group (A) to Ester Group
   (B) is from about 1:1.5 to 1:2.5; and wherein $R^1$ is a saturated hydrocarbon radical containing 2–10 carbon atoms;
   $R^2$ is selected from the group consisting of alkylene, vinylene, aromatic, carbocyclic and heteroradicals, and
   $R^3$ is selected from the group consisting of a saturated aliphatic hydrocarbon radical having one to 26 carbon atoms and an ethylenically unsaturated aliphatic hydrocarbon radical having 12 to 18 carbon atoms;
   (b) 5–50% by weight, based on the weight of the polymer, of a melamine formaldehyde resin which has been at least partially reacted with an aliphatic monohydric alcohol having from 1–4 carbon atoms;
   (c) 2–15%, by weight, based on the weight of the polymer, of pentaerythritol tetrabenzoate.

2. The composition of claim 1 wherein the backbone consists essentially of styrene and an acrylic ester selected from the group consisting of an alkyl methacrylate, an alkyl acrylate and mixture thereof in which the alkyl group contains 1–12 carbon atoms; in which
   $R^1$ is a saturated hydrocarbon group having 2–4 carbon atoms,
   $R^2$ is an aromatic radical, and
   $R^3$ is a tertiary hydrocarbon group having eight through ten carbon atoms.

3. the composition of claim 1 which contains about 5% by weight, based on the weight of the polymer, of pentaerythritol tetrabenzoate.

4. The composition of claim 1, 2, or 3 wherein the pentaerythritol tetrabenzoate functions as an antiplasticizer.

* * * * *